United States Patent Office 3,175,881
Patented Mar. 30, 1965

3,175,881
METHOD OF PRODUCING CRYSTALLINE
AMMONIUM METATUNGSTATE
Vincent Chiola, John M. Laferty, Jr., and Clarence D. Vanderpool, Towanda, Pa., assignors to Sylvania Electric Products Inc., a corporation of Delaware
No Drawing. Filed July 10, 1962, Ser. No. 208,922
2 Claims. (Cl. 23—51)

This invention relates to an improved method for producing ammonium metatungstate. More particularly, the invention is concerned with a method for preparing ammonium metatungstate in crystalline form employing ammonium paratungstate as the starting material.

Tungsten, generally in the form of tungsten oxide, $WO_3$, is useful as a component of a variety of catalysts for chemical reactions. In most cases in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_4)_6H_2W_{12}O_{40} \cdot xH_2O$, is a particularly useful solute in such solutions. It offers the advantage of being readily soluble in water and, in addition, it decomposes readily on heating to leave the desired catalytic residue of tungsten oxide in the carrier. Alkali metal salts of the tungstates are also water-soluble, but their use in catalyst manufacture is restricted by the fact that the presence of residual alkali metals frequently is objectionable in catalytic materials.

Heretofore there has not been available an economically practicable method for obtaining ammonium metatungstate of adequate purity in crystalline form, and for this reason catalyst manufacturers have found it expedient to prepare solutions containing ammonium metatungstate by digesting aqueous slurries of tungstic oxide with ammonia followed by filtering of the insoluble residue of the digestion operation from the desired solution. By this technique, the production of crystalline ammonium metatungstate has been avoided. However, the method is necessarily time consuming and involves the use of a substantial amount of equipment for the extended digestion and filtering operations. Furthermore, a substantial amount of tungsten either is lost in the residue from the digestion operation or must be recovered and reprocessed. Additionally small amounts of other tungsten compounds, particularly the substantially insoluble ammonium paratungstate may tend to precipitate from the solution in use and complicate the further processes of catalyst manufacture.

It has also been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammonium paratungstate is not converted entirely to ammonium metatungstate at any particular temperature, nor after any particular baking time. To the contrary, other degradation products, particularly insoluble tungsten oxide, $WO_3$, also are continuously formed during the baking. In addition, certain amounts of unconverted ammonium paratungstate remain. As a result, substantial amounts of insoluble $WO_3$ and also ammonium paratungstate, which is only slightly soluble, remain undissolved when it is attempted to dissolve the product of the baking operation, making it necessary to filter the solution before use, and discard or reprocess the insoluble materials. Also, as indicated above, the small amount of paratungstate remaining in solution may complicate use of the solution because of its tendency to precipitate out with temperature changes or evaporation of the water.

It is, therefore, an object of this invention to provide an improved method for obtaining ammonium metatungstate in crystalline form.

It is a further object of the invention to provide a method for obtaining ammonium metatungstate in crystalline form from which water solutions may be prepared directly without the formation of insoluble materials.

It is a still further object to provide an improved method for producing crystalline ammonium metatungstate from ammonium paratungstate in which the loss of tungsten-containing by-products is reduced to a minimum.

The foregoing objects are achieved in accordance with the method of the present invention by calcining ammonium paratungstate to drive off ammonia and water vapor, dissolving the calcined material in water, digesting and evaporating the resulting solution, and thereafter crystallizing ammonium metatungstate from the solution. As will be apparent from the following more detailed description of the process, each of these steps are carried out under certain conditions and with certain controls in order to obtain crystalline ammonium metatungstate of the desired quality and with the desired degree of efficiency.

In the process, commercially available ammonium paratungstate, which has the generally accepted formula, $(NH_4)_{10}H_2W_{12}O_{41} \cdot xH_2O$, first is heated, or calcined, to drive off ammonia and water vapor. In this operation most of the ammonium paratungstate is converted to ammonium metatungstate. Small quantities of tungsten oxide may also be produced and a small amount of the paratungstate compound may be unconverted. Desirably the quantities of either of these materials should be as small as practicable in the calcined product.

The calcination of the ammonium paratungstate may be accomplished, for example, by heating the material in batches in trays, or the material can be fed continuously through a rotary type kiln. In any case, there should be provision for ample exhaust of the ammonia and water vapor as it is evolved from the paratungstate to maintain equilibrium conditions favorable to the conversion of the ammonium paratungstate to ammonium metatungstate. Temperatures of between about 300° F. and 700° F. may be employed in calcining the material. However, it has been found that the desired conversion is obtained at an optimum rate, consistent with good control of the process and uniformity of results, when the material is maintained at between 500° F. and 600° F.

The time required to accomplish the desired degree of calcination may be varied substantially, depending on the type and manner of operation of the apparatus employed. For example, periods of from about 4 hours to about 8 hours have been employed when the ammonium paratungstate was simply contained in stationary trays in a furnace. Typically, these trays may contain a volume of material measuring about 30 inches by 15 inches by 1 inch. Air should be admitted to and exhausted from the furnace to effectively carry away the ammonia and water vapor as it is driven from the material. It has been found that the calcination operation can be carried out most efficiently in a continuous rotary calciner. Typically, using a rotary calciner, residence times of the order of about 1 hour normally are sufficient to drive off the proper amount of ammonia and water vapor from the ammonium paratungstate.

Although, as indicated above, various combinations of temperatures, residence times and types of apparatus may be employed in the calcination, it has been found that the extent to which the calcination or baking of the ammonium paratungstate is carried out is relatively critical. More particularly, if the material should be over-calcined, an excessive quantity of free tungsten oxide is produced. At least a substantial portion of this may not be dissolved in the subsequent digestion step, and represents a loss of yield. On the other hand, insufficient calcination or baking of the paratungstate may result in a substantial residue of difficultly soluble ammonium paratungstate which may be lost along with tungsten oxide in the subsequent digestion step or may remain as an undesirable contaminant of the crystalline ammonium metatungstate product. It has been found that the extent of the calcination of the paratungstate required is such that the content of tungsten oxide ($WO_3$) of the product of the calcination step should be between about 93% and 94%. Commercially available ammonium paratungstate has the generally accepted formula, $$(NH_4)_{10}H_2W_{12}O_{41} \cdot xH_2O$$

where "$x$" may range from 6 to 28, and a reduction of weight of the material of from about 5% to about 7% normally will result in material of the above-mentioned tungsten oxide content. As a further guide to those skilled in the art following the process herein described, it has been determined that the calcined material is in optimum condition for the further steps of the process when an aqueous slurry containing about 9% by weight of the material exhibits a pH of from about 3.5 to about 4.0. Materials exhibiting a slightly broader range of pH values, e.g., 3 to 5, may be used, but it is preferred to use materials in the narrower pH range of 3.5 to 4.0. Since this pH value decreases in value with an increase in the degree of calcination of the ammonium paratungstate, optimum conditions of the time, temperature, etc. for any suitable type of calcining apparatus may be readily determined with a small amount of experimentation.

After the ammonium paratungstate has been calcined as described above, the material is added to water to form a slurry. All of the material does not dissolve, but the insoluble portion, including tungsten oxide and any unconverted ammonium paratungstate, is permitted to remain in the water during the subsequent digestion and evaporation. Best results from the standpoint of yield and quality of the metatungstate product have been obtained by incorporating from about 9% to 10% of the calcined material in water. Although the method can be carried out with larger proportions of water, obvious inefficiencies are introduced because of the necessity for evaporating the excess water. Slightly smaller quantities of water also may be used but, as will be apparent from the following explanation, the digestion step may then not adequately convert the residual paratungstate in the calcined material, resulting in lower yields or contaminated product. Preferably the water has previously been heated to about 80° C. before the calcined material is added to it.

The slurry next is heated, or digested, under conditions permitting free evaporation of the water and escape of ammonia produced by the digestion. An open kettle is suitable for this purpose. During the digestion step of the process further conversion of residual quantities of the ammonium paratungstate in the calcined material to ammonium metatungstate takes place with the evolution of ammonia. Since the temperature of the water in which the material is dissolved or suspended is below the boiling point, for example, between 70° C. and 90° C., it appears that the residual ammonium paratungstate is converted without the production of substantial further quantities of $WO_3$. Desirably, the pH of the slurry is maintained in the range of 3.5 to 4.0, as indicated above, and it may be necessary to add ammonium hydroxide periodically to keep the pH within this range during the digestion operation.

In the process, advantage is taken of the moderate heating necessary for further removal of the residual ammonium paratungstate to also evaporate the water containing the ammonium metatungstate. After the volume of the slurry has been reduced sufficiently, preferably to about one-third of its original volume, it is passed through a filter to remove insoluble material, chiefly $WO_3$. The clarified solution from the filter is further heated and evaporated in a jacketed evaporating kettle until crystallization begins. As the crystallization begins the solution is cooled, as by passing cooling water through the jacket of the kettle, and the suspension of crystals is agitated and mixed until crystallization is essentially completed. The wet crystals are then dried with moderate heat.

The crystals produced as described above dissolved readily in water to form clear solutions, indicating that they are nearly pure ammonium metatungstate, and that the material is substantially free of difficultly soluble ammonium paratungstate. As mentioned earlier in this specification, the crystalline material is eminently satisfactory for use in catalyst preparations since it is economically stored and shipped, and can be dissolved as needed in the catalyst manufacture, with minimum apparatus requirements.

In view of the high cost of tungsten compounds and the cost of reprocessing tungsten-containing by-products, the process herein described affords the further advantage of being capable of providing high product yield. More particularly, and based on the $WO_3$ contents of the starting ammonium paratungstate yields of the order of 75% or more are attainable, the primary source of loss of tungsten being in the tungsten oxide unavoidably produced during the calcination step and removed during the filtering step prior to crystallization of the ammonium metatungstate.

In order that those skilled in the art better may comprehend the process described, an example of the process is given below.

Commercial ammonium paratungstate was first fed through a continuous rotary calciner at the rate of about 90 pounds per hour. The calciner was maintained at a temperature of 530° F. and the resident time of each increment of material in the calciner was approximately 1 hour. 150 pounds of the calcined material was added to 180 gallons of water heated to about 80° C. and contained in an open steam jacketed kettle. The pH of the resulting slurry was about 3.9. The slurry was maintained at temperatures within the range of 80° C. to 90° C. for about four hours during which time the volume of the slurry was reduced by evaporation to about one-third of its original volume. During this period of digestion and evaporation it was necessary to add 65 mililiters of ammonium hydroxide in increments to maintain the pH of the slurry between 3.5 and 4.0.

When the volume of the slurry had been reduced to about one-third of its original volume, it was passed through a filter and the resulting clear solution was transferred into a jacketed evaporating kettle. Heating and evaporation then was continued until a layer of crystals began to appear on the surface of the solution. At this point, cooling water was admitted to the jacket of the kettle and the mixture of solution and crystals was agitated as the temperature of the mixture was reduced. Upon the disappearance of a liquid phase from the material in the kettle, the crystals were finally dried by application of heat from infra red lamps. The crystals so produced dissolved promptly in water at 25° C. to produce a clear solution. Based on the $WO_3$ contents of the ammonium paratungstate supplied to the calciner and the ammonium metatungstate produced, the yield was 78.1%.

What is claimed is:

1. The method of producing ammonium metatungstate crystals which comprises heating ammonium paratungstate at a temperature within the range of 300° F. to 700° F. until an aqueous slurry containing about 9% by weight of the material so heated exhibits a pH of between 3 and 5; mixing the material with water at a temperature in the range from above about 70° C. to below the boiling point of water to form a slurry thereof containing from about 9% to about 10% of the material; maintaining the slurry at a temperature in the aforesaid range and adding ammonium hydroxide thereto as needed to maintain the slurry at a pH of from about 3.0 to about 5.0 until the slurry has been reduced to about one-third of its original volume; filtering the concentrated slurry; and crystallizing ammonium metatungstate from the filtrate.

2. The method of producing ammonium metatungstate which comprises heating ammonium paratungstate at a temperature of between about 500° F. and 600° F. to evolve ammonia and water therefrom; discontinuing said heating when an aqueous slurry containing about 9% by weight of the material so heated exhibits a pH of between about 3.5 and about 4.0; mixing the material with sufficient water at a temperature in the range of 80° C. to 90° C. to form a slurry containing from about 9% to about 10% by weight of the material; maintaining the slurry at a temperature in the aforesaid range and adding ammonium hydroxide thereto as needed to maintain the slurry at a pH of from about 3.5 to 4.0 until sufficient water and ammonia has been evolved therefrom to reduce the slurry to about one-third of its original volume; filtering the concentrated slurry; and crystallizing ammonium metatungstate from the filtrate.

References Cited by the Examiner

Taylor: "Journal of the American Chemical Society," vol. 24, July 1902, pages 629–643 (pages 631–633 of particular interest).

Scheibler: "Journal für Praktische Chemie," vol. 83, 1861, pages 273–332 (pages 304–306 of particular interest).

MAURICE A. BRINDISI, *Primary Examiner.*

BENJAMIN HENKIN, *Examiner.*